Figure 1:
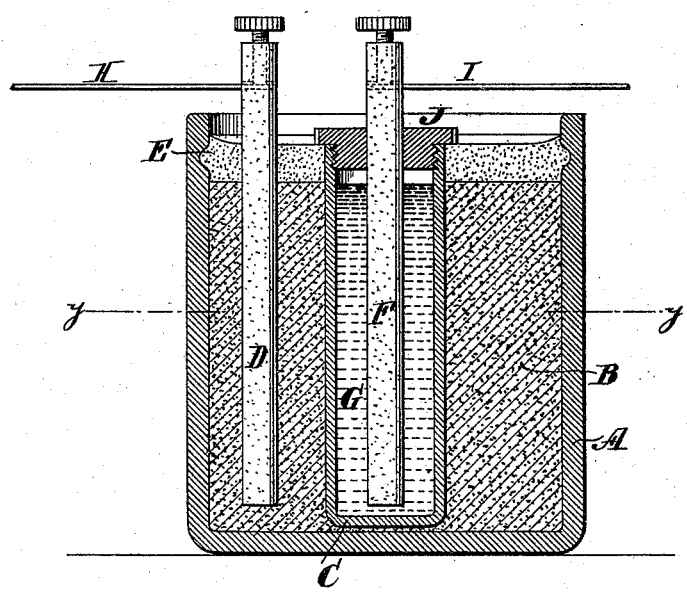

(No Model.)

L. W. PULLEN.
REVERSIBLE PRIMARY BATTERY.

No. 585,699. Patented July 6, 1897.

Witnesses.  
Henry Drury  
Wm L Evans

Inventor.  
Leon W. Pullen  
By _____  
Attorney.

UNITED STATES PATENT OFFICE.

LEON W. PULLEN, OF CAMDEN, NEW JERSEY, ASSIGNOR OF THIRTEEN-SIXTIETHS TO CHARLES L. KLAUDER AND ALBERT E. BAINBRIDGE, OF PHILADELPHIA, PENNSYLVANIA.

REVERSIBLE PRIMARY BATTERY.

SPECIFICATION forming part of Letters Patent No. 585,699, dated July 6, 1897.

Application filed October 23, 1896. Serial No. 609,807. (No model.)

*To all whom it may concern:*

Be it known that I, LEON W. PULLEN, of the city and county of Camden, State of New Jersey, have invented an Improvement in Reversible Primary Batteries, of which the following is a specification.

My invention has reference to batteries; and it consists of certain improvements which are fully set forth in the following specification and are shown in the accompanying drawings, which form a part thereof.

The object of my invention is to provide a suitable construction of battery which shall be light in weight, efficient in operation, capable of being readily charged and discharged without injury, inexpensive in construction, and durable in operation.

My invention is especially designed for secondary batteries, but may be used with primary batteries also. Hence I do not confine myself to any special use.

Heretofore oxid of manganese has been used in primary batteries as a depolarizer without an attempt to increase the voltage of the battery; but in my invention the peroxid of manganese is employed as an impalpable or fine powder mixed with finely-divided carbon and a concentrated solution of sulfuric acid for the purpose of producing a salt of manganese as the basis of the cathode for increasing the voltage and when combined with the other elements, as set out in this application, capable of being charged like a secondary battery with a still further increase in voltage.

In carrying out my invention I employ a negative electrode formed by mixing together powdered coke, graphite or plumbago, and an oxid of manganese (preferably the peroxid of manganese) made into a thick paste with concentrated sulfuric acid. The oxid of manganese is the oxidizing element. This electrode is provided with one or more terminals, preferably in the form of a piece of carbon extending down into the mass of the electrode. An electrode of this character is preferably arranged in a sealed condition within the battery-case and is separated from the positive electrode by means of a porous diaphragm cell or cup containing sulfuric acid, preferably in a dilute condition. The positive may be formed of zinc and preferably arranged centrally within the porous cell. In operation the powdered coke or amorphous carbon and graphite act as the conductor for the current from all portions of the negative electrode, the carbon tending to reduce the weight of the same while acting as a conductor and the graphite acting to keep down the internal resistance. In practice the amorphous carbon, which is preferably finely-crushed gas-retort coke, such as would pass through a No. 80 mesh, is thoroughly mixed with the graphite or crystallized carbon, so that all particles of the former are practically incased or inclosed in graphite, and at the same time is also intimately mixed with powdered peroxid of manganese and the entire ingredients formed into a pasty condition by the addition of concentrated sulfuric acid. This changes the oxid into the sulfate of manganese. It will be seen from this that the particles of graphited amorphous carbon act as an excellent conductor of electric current and at the same time maintain the entire negative electrode in a porous condition, so that the decomposition necessary for the proper electrolytic action may take place throughout its entire mass with the greatest facility. The best results are secured by having the plumbago ground as fine as possible—such, for instance, as is used for polishing by lithographers. The manganese should be ground to about the same fineness as the plumbago, though inferior results can be secured when it is not so finely subdivided. The electrode formed of this mixture is inclosed to hold it against expansion and may be employed in a primary or secondary battery as desired.

My invention will be better understood by reference to the accompanying drawings, in which—

Figure 2:
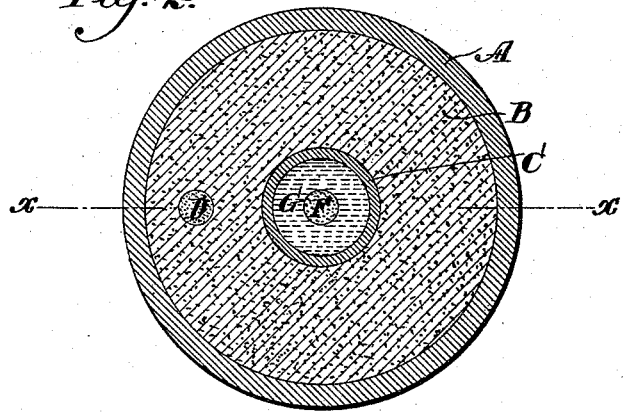

Figure 1 is a sectional elevation of a secondary battery embodying my invention, taken on line *x x* of Fig. 2; and Fig. 2 is a sectional plan view of same, taken on line *y y* of Fig. 1.

A is the outer case or box and may be formed of glass, rubber, metal, or other material, if desired.

C is an inner porous diaphragm cup or chamber, preferably of asbestos, unglazed porcelain, or terra-cotta.

F is a centrally-disposed electrode of zinc arranged within the porous cup.

B is the negative electrode and consists of the intimate pasty mixture of amorphous carbon, graphite, sulfate of manganese, and concentrated sulfuric acid hereinbefore described. The preferred proportions of these ingredients, which I have found excellently adapted to the purpose in practice, are one part of graphite by measure, a half part of crushed gas-retort coke, one-quarter part of peroxid of manganese, and sufficient concentrated sulfuric acid to produce a thick spongy mass. The sponge so formed is forced into the case between its walls and the porous cell or diaphragm and preferably surrounds the latter. The terminal D may be made of carbon, metal, or any conducting substance and is inserted into the electrode B and projects above. This electrode is then sealed permanently in position by a suitable sealing substance, as sealing-wax E. Any form of wax not capable of ready melting by low heat will suffice. The porous cell is filled with dilute sulfuric acid G and may be sealed by a cap J, which prevents evaporation and at the same time centralizes the positive electrode F. H is the positive and I the negative conductor leading from the electrodes. When mixing the ingredients, certain reactions occur, producing great heat and converting the concentrated sulfuric acid and peroxid of manganese into manganic sulfate. In the subsequent operation of this cell in discharging the sulfuric acid attacks the zinc, forming the sulfate of zinc. The concentrated sulfuric acid in the negative electrode becomes diluted. These reactions produce a current between the electrodes and in the external circuit.

In charging the battery the reverse operation takes place, namely: The dilute sulfuric acid is decomposed, setting free oxygen, which combines with the manganese to form a higher oxid, and the sulfate of zinc is decomposed with the deposition of metallic zinc on the positive electrode. The hydrogen set free in the negative electrode combines with the oxygen from the decomposed sulfate of zinc and forms water, which dilutes the sulfuric acid in the porous cup, while the sulfuric acid in the positive electrode is again brought to the concentrated condition. These reactions will explain the nature of what mainly takes place and may be assumed as the reactions of the battery, notwithstanding that some more complex reactions no doubt occur in conjuncture therewith.

In the operation of my improved battery, when used as a primary battery, at the start it delivers a difference of potential of 2.2 volts, and when used as a secondary battery after recharging its voltage increases to 2.5 volts.

It is evident that any number of terminals may be employed in connection with the negative electrode, and it is also to be understood that the proportions of the several ingredients may be varied without departing from the spirit of the invention.

The number, shape, or configuration of the battery-cell or its parts is immaterial, as the shape and materials of the porous diaphragm or cell may be varied to suit the ideas of the designer, the form shown being the simplest construction and excellently suited as an illustration of the general features of the invention.

What I claim as new, and desire to secure by Letters Patent, is—

1. A reversible primary battery comprising a suitable cathode, a depolarizing mass in contact therewith and consisting of a mixture of finely-divided carbon, a salt of manganese and concentrated sulfuric acid uniformly distributed throughout said mixture and an anode arranged in a dilute electrolyte.

2. A reversible primary battery comprising a suitable cathode, a depolarizing mass in contact therewith and consisting of a mixture of finely-divided plumbago, concentrated sulfuric acid and a salt of manganese, and an anode arranged in a dilute electrolyte.

3. A reversible primary battery comprising a suitable cathode, a depolarizing mass in contact therewith and consisting of a mixture of finely-divided amorphous carbon and plumbago, concentrated sulfuric acid and a salt of manganese, and an anode arranged in a dilute electrolyte.

4. A battery consisting of an outer case, an inner porous diaphragm cup or vessel, a positive electrode arranged within the porous cup or diaphragm, dilute sulfuric acid within the porous cup and surrounding the positive electrode, and a negative electrode consisting of finely-divided amorphous carbon and graphite mixed with sulfate of manganese and concentrated sulfuric acid.

5. A battery consisting of an outer case, an inner porous diaphragm cup or vessel, a positive electrode arranged within the porous cup or diaphragm, dilute sulfuric acid within the porous cup and surrounding the positive electrode, a negative electrode consisting of finely-divided amorphous carbon and graphite mixed with sulfate of manganese and concentrated sulfuric acid, a seal arranged above the negative electrode and connecting the outer case with the porous cup, and a terminal extending from without the cell into the mass of the negative electrode.

6. In a battery an electrolyte-containing case, a negative electrode composed of an intimate mixture of finely-divided amorphous carbon, graphite and sulfate of manganese, a positive electrode consisting of zinc, a porous diaphragm between the positive and negative electrodes, dilute sulfuric acid surrounding the positive electrode, and concentrated sulfuric acid intimately mixed with the negative electrode.

7. An electrode for a battery consisting of an intimate mixture of powdered gas-retort coke, graphite, sulfate of manganese, and a concentrated electrolyte substantially in the proportion specified, namely, one part of graphite by measure to one-half part of coke and one-quarter part of oxid of manganese, in combination with a conductor extending from the interior of the electrode outwardly.

8. An electrode for a battery consisting of an intimate mixture of powdered gas-retort coke, graphite, sulfate of manganese, concentrated sulfuric acid substantially in proportions specified, namely, one part of graphite by measure to one-half part of coke and the quantity of sulfate of manganese produced by mixing one-quarter part of oxid of manganese with concentrated sulfuric acid, in combination with a conductor extending from the interior of the electrode outwardly, an inclosing case to prevent expansion of the pasty mass, and a terminal extending through the case into the body of the electrode.

9. A reversible primary battery comprising a suitable cathode, a depolarizing mass in contact therewith and consisting of a mixture of finely-divided coke and plumbago, concentrated sulfuric acid and a salt of manganese, and an anode arranged in a dilute electrolyte.

In testimony of which invention I have hereunto set my hand.

LEON W. PULLEN.

Witnesses:
R. M. HUNTER,
WM. D. EVANS.